(No Model.)
W. AGER.
GRAIN DECORTICATING APPARATUS.
No. 258,340. Patented May 23, 1882.
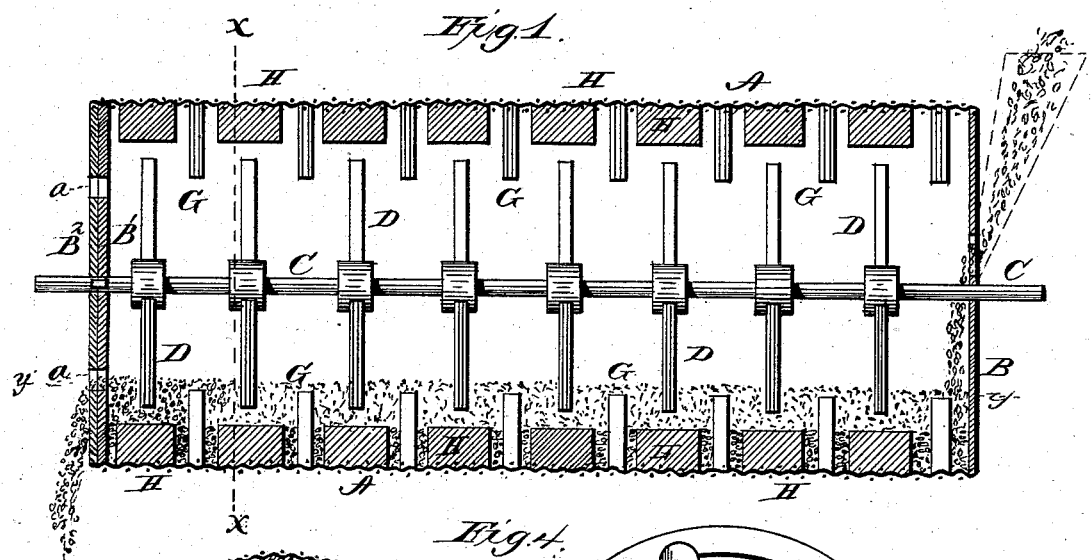
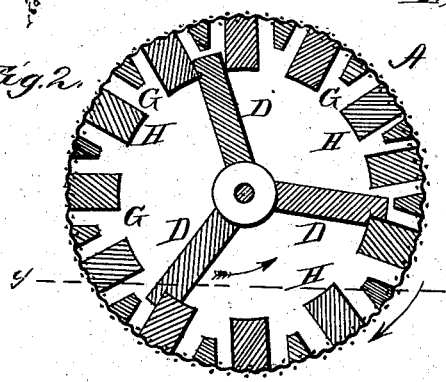
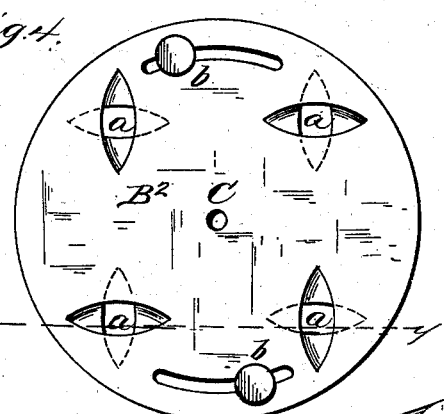
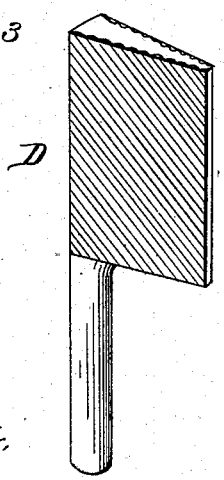
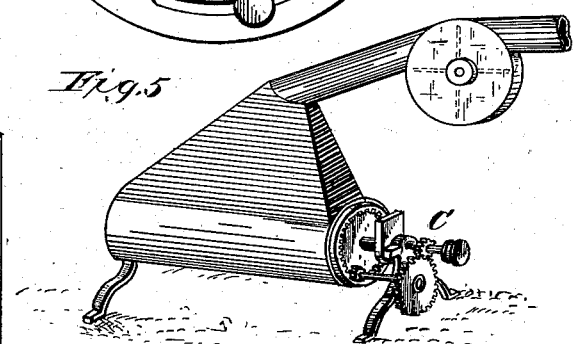
Witnesses.
P. L. Ourand
J. J. McCarthy.
Inventor.
Wilson Ager.
By C. M. Alexander
Atty

UNITED STATES PATENT OFFICE.

WILSON AGER, OF WASHINGTON, DISTRICT OF COLUMBIA.

GRAIN-DECORTICATING APPARATUS.

SPECIFICATION forming part of Letters Patent No. 258,340, dated May 23, 1882.

Application filed September 17, 1881. (No model.)

*To all whom it may concern:*

Be it known that I, WILSON AGER, of Washington city, in the county of Washington, and in the District of Columbia, have invented certain new and useful Improvements in Grain-Decorticating Apparatus; and I do hereby declare that the following is a full, clear, and exact description thereof, reference being had to the accompanying drawings, and to the letters of reference marked thereon, making a part of this specification.

My invention consists in certain improvements in grain-decorticators, which I will hereinafter describe and illustrate.

In the annexed drawings, Figure 1 is a diametrical section. Fig. 2 is a transverse vertical section; Fig. 3, a perspective view of one of the decorticating-blades. Fig. 4 is an end view of one end of the cylinder, showing the adjustable head and discharge-openings; Fig. 5, a perspective view of the machine complete.

Part of the machine represented in the annexed drawings is the subject of another application which was filed July 30, 1881.

The letter A designates a cylindrical screen, and B B' B² the heads thereof. The grain is fed into the cylinder through the head B from a hopper and discharged from the opposite end of the cylinder through the heads B' B². The cylinder A is arranged horizontally, and centrally through it passes a shaft, C, bearing a series of radial arms or decorticators, D, which may be made of any suitable material, presenting serrated or abrading surfaces. The arms may be made of steel, with file-surfaces, or of natural or artificial abrasive material—such as Derbyshire gray, tannite, or pressed Turkish emery, properly molded or shaped. The said arms are preferably made triangular or wedge-shaped in cross-section. The shaft C, with its arms, receives rotation by suitable machinery in the direction indicated by the arrow in Fig. 2. The cylinder A receives a slower rotation than the shaft C and in an opposite direction, as indicated by the arrow.

Rigidly secured to the inner side of cylinder A, and arranged in any suitable manner, are decorticators G H, which may be of equal or unequal length. The decorticators G are preferably arranged edgewise with respect to arms D, and are, like these arms, triangular in cross-section, and present serrated or abrading surfaces to the body of the grain in the cylinder to which they are attached. The decorticators H are preferably arranged flatwise with respect to the radial arms D and aid in elevating the grain during the decorticating process.

The screen-cylinder A is suitably incased, and the interior of this case communicates with a fan for the purpose of creating currents of air, and thereby carrying off the pellicle, dust, and other foreign matters separated from the grain. The foreign matters are carried off through the meshes of cylinder A and through the casing which incloses this cylinder, and which is represented in Fig. 5.

The grain is fed into the cylinder A, as described, and discharged through openings $a$. These openings are formed by oblong slots through the cylinder-heads B' B². The outer head is movable about its axis, and the slots are of such a shape that the points of discharge of the grain can be raised or lowered without materially increasing or diminishing their size. The conjugate diameters of the slots $a$ are tangential to a circle described within the circumference of each plate B' B² concentric to the axis of the shaft C. By means of set-screws $b$ the movable head B² can be fixed to the head B' after adjustment. By these means a uniform discharge of grain can be obtained, although the points of discharge be adjusted higher or lower, according to the quality of grain acted on.

The proper level of the grain to produce the best result is maintained by regulating the distance of the discharge-openings from the circumference of the cylinder and the amount of feed as above described.

It is essential to the successful carrying out of my invention that the feed of the grain into one end of the screen-cylinder should be equal to the discharge of the grain from the opposite end of the cylinder, and it is also essential that the grain be moved from one end of the cylinder horizontally through the same.

Having described my invention, I claim—

The combination of the horizontal cylinder provided with a feed-opening at one end, the shaft C, having decorticators mounted on it, the adjustable discharging-passages at the opposite end, means for moving the shaft and screen, and decorticators attached thereto, in opposite directions with a relatively fast and slow speed, an inclosing-shell for said cylinder, and means for producing an air-blast, substantially as described.

In testimony whereof I affix my signature, in presence of two witnesses, this 13th day of September, 1881.

WILSON AGER.

Witnesses:
J. J. McCARTHY,
H. J. ENNIS.